Jan. 17, 1956     H. F. STEINER     2,730,858
MOWER GUARD
Filed Nov. 18, 1953
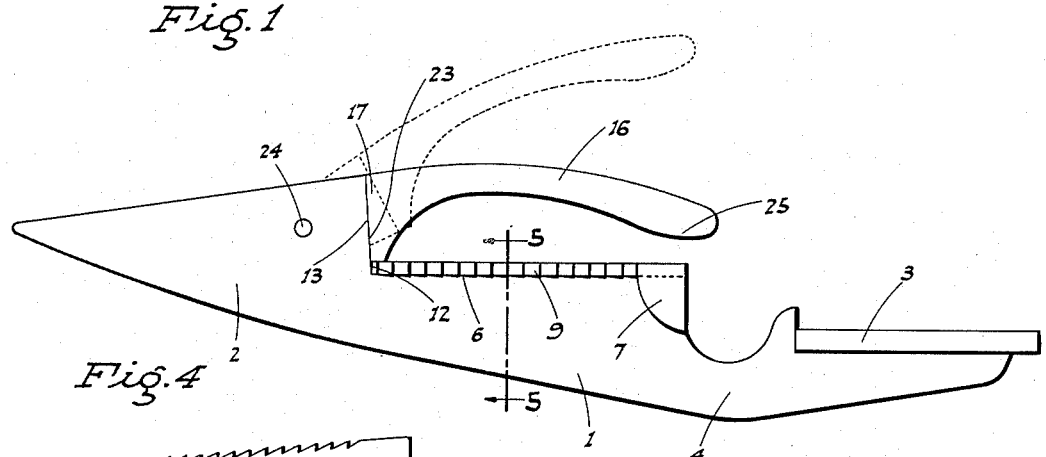
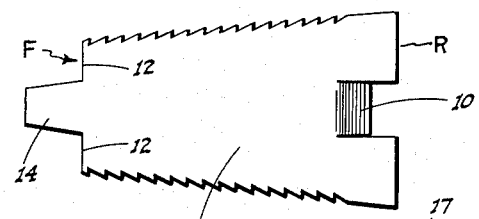
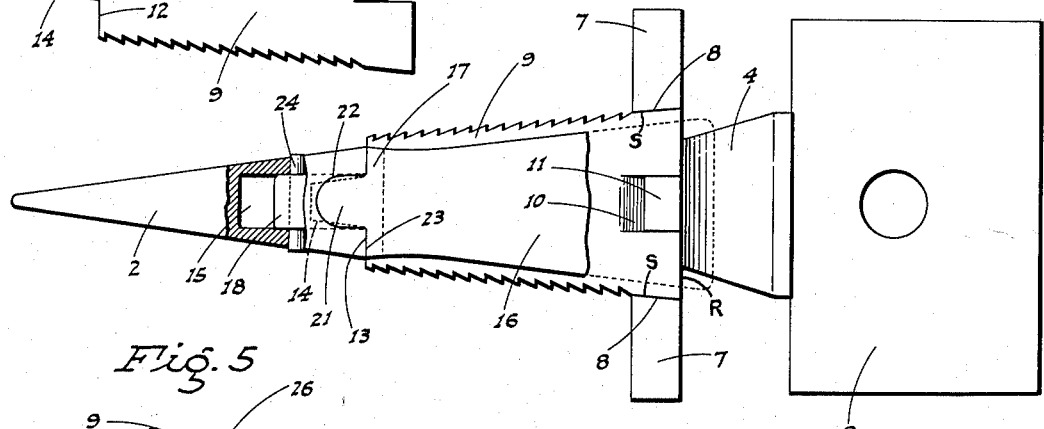
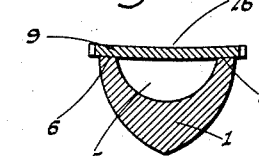
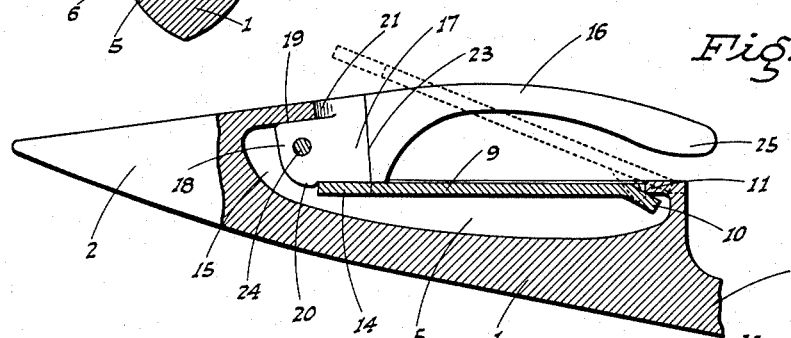
INVENTOR
Howard F. Steiner
BY
Webster & Webster
ATTYS United States Patent Office 2,730,858
Patented Jan. 17, 1956

2,730,858
MOWER GUARD

Howard F. Steiner, Stockton, Calif.

Application November 18, 1953, Serial No. 392,826

4 Claims. (Cl. 56—307)

This invention relates to the guards which are used in connection with the reciprocating cutter bar of an agricultural mower, and which guards include the fixed blades or ledger plates to cooperate with the movable blades of the cutter bar.

For cutting efficiency and to keep down replacement costs, it is desirable that the ledger plates be removable from the guards for resharpening or replacement, if necessary. It is also desirable that the cap on each guard shall be replaceable without having to discard the entire guard, since the caps in the ordinary type of guard are integral therewith, and if the caps break off, as is frequently the case, the entire guard must be replaced.

It is therefore the principal object of my invention to provide a mower guard having a removable ledger plate, which is removably held in place at both ends so that the desired operative rigidity of the ledger plate is retained.

Another object of the invention is to provide a removable cap for the guard, and one which may be mounted on or removed from the guard without the need of any special tools, and without having to remove the guard from the mower assembly.

A further object of the invention is to provide an extremely simple arrangement for retaining the ledger plate in place, and which includes the removable guard cap.

Still another object of the invention is to arrange the guard caps so that in the mower assembly they may also serve as the knife clips, to take the place, if desired, of the usual hold-down knife clips.

An additional object of the invention is to provide a mower guard which is designed for ease and economy of manufacture.

It is also an object of the invention to provide a practical and reliable mower guard, and one which will be exceedingly effective for the purpose for which it is designed.

These objects are accomplished by means of such structure and relative arrangement of parts as will fully appear by a perusal of the following specification and claims:

In the drawings:

Fig. 1 is a side elevation of the improved mower guard.

Fig. 2 is a top plan view of the same, partly broken away, and partly in section.

Fig. 3 is a fragmentary elevational view of the guard with parts broken away and shown in section.

Fig. 4 is a plan view of the ledger plate, detached.

Fig. 5 is a fragmentary cross section on line 5—5 of Fig. 1.

Referring now more particularly to the drawings, and to the characters of reference marked thereon, the guard is of generally conventional form, so that it will fit various standard mowers, and comprises a body having a central portion 1, a front-end substantially pointed nose 2 ahead of the central portion, and a rear-end relatively wide flat mounting plate 3 connected to portion 1 by a dependent neck 4 arranged as usual so as not to interfere with the movement of the knife bar of the mower.

The central portion 1 is recessed or hollowed out from the top down for its full length, as at 5, leaving flat upper side edge surfaces 6. Cross bars 7 project laterally out from the sides of portion 1 at its rear end, with their upper surface above the level of edges 6 to form upstanding shoulders 8 at their adjacent ends.

The initially separate and removable ledger plate 9 rests on and overhangs the surfaces 6, resting also on the transverse surface between the shoulders 8. The side edges of the plate at the rear fit closely between the shoulders 8, as shown in Fig. 2. Centrally of its width, the ledger plate at its rear end R is cut to provide a downwardly and rearwardly sloping tongue 10, arranged to wedgingly engage under a lip 11 formed with the body portion 1 between shoulders 8 on a level with edges 6 and overhanging the hollowed-out area 5. At its forward end F the ledger plate is formed with lateral shoulders 12 which abut, when the ledger plate is in position, against the upstanding rear end face 13 of the nose 2. Between shoulders 12 the ledger plate is formed with a forwardly projecting straight tongue 14 which extends with a lateral fit into a cavity 15 projecting forwardly into the nose from the rear end face 13 thereof, and the lower portion of which cavity is an extension of hollow area 5.

The removable cap 16 is formed at its forward end with a head 17 whose forward relatively narrow portion 18 projects into cavity 15 with a snug fit between the top surface 19 of the cavity and the ledger plate tongue 14 below, as shown in Fig. 3.

At its forward end and at the bottom the head portion 18 is shaped to provide a shallow curved depending lip 20 arranged to project ahead of and below the tongue 14 when the parts are in place.

The upper rear end portion of the head 17 projects above the cavity face 19 and is formed as a rounded locating element 21 which fits in an opening 22 formed in nose 2 forwardly of the rear end face 13 thereof. To the sides of portion 18 at the rear end thereof the head is formed with lateral upstanding shoulders 23 abutting the upstanding face 13 of the rear end of the nose 2.

The nose and head are drilled transversely so as to receive a removable taper pin 24 which—when in place—prevents removal of the cap 16.

As shown in Figs. 1 and 3, the cap 16 extends to the rear end of the ledger plate, and turns down at its rear end, as shown at 25, so as to overhang and substantially engage the knives of a mower cutter bar at their base, or where such knives are normally engaged by the usual knife clips of a mower assembly.

As shown at 26 in Fig. 5, the ledger plate is formed with a shallow transverse concavity. This feature disposes the side edges of the ledger plate only in contacting relation with the cooperating reciprocating blades of the knife bar above, and will thus provide a more effective cutting action than when the ledger plates are flat, as is ordinarily the case.

In operation, to assemble the ledger plate and cap on the guard, the ledger plate is disposed over the guard with a downward tilt to the rear so that the tongue 10 engages under the lip 11, as indicated in dotted lines in Fig. 3.

The front end of the ledger plate is then pressed down to position on the flat edges 6, the width and length of the tongue 14 being such that it will pass through the opening 22 without interference.

The cap 16 is then mounted in place. This is most readily done by first disposing the cap at a forward and downward angle, as indicated in dotted lines in Fig. 1, so that the element 21 is initially located in the opening 22 and with the lip 20 of head portion 18 projecting into cavity 15 and engaging the tongue 14 of the ledger plate 9. The cap is then swung down and pressed forwardly until the shoulders 23 aline with and abut against face 13, which disposes the holes for pin 24 in alinement, allowing said pin 24 to be readily inserted.

The cavity surface 19 is at a slight downward and forward angle to the ledger plate supporting area 6 and hence to the ledger plate itself, so that forward movement of head 17 to its fully seated position assures a firm downward seating pressure being imparted to the ledger plate, as is of course desirable. The shallow lip 20 projects ahead of and snaps below the tongue 14 when the cap 16 is in its seated position—a feature which prevents displacement of the cap in a straight rearward direction should the pin 24 become accidentally dislodged.

To remove the ledger plate, operations the reverse of those described above must be carried out, since it will be obvious that said plate cannot be removed until the cap 16 is removed. It will also be seen that the ledger plate is definitely locked in place at both ends, and neither end can shift upwardly or laterally, and yet without any holding bolts or other similar securing means being necessary.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A mower guard comprising a body, a portion of which has an upwardly facing flat surface, a ledger plate resting on said surface, a removable cap for the guard, means between the cap and plate to retain the latter at its forward end against upward movement when the cap is mounted in place on the guard, a tongue formed in the plate from its rear end intermediate its side edges and projecting at a downward and rearward angle, and a lip on the body overhanging the tongue; the upper face of the lip being flush with the upper surface of the plate when the tongue is engaged with the lip.

2. A mower guard comprising a body, a portion of which has an upwardly facing flat surface, a ledger plate resting on said surface, means between the body and ledger plate at the rear end of the latter to releasably lock the plate against upward lateral and rearward movement, a removable cap for the guard, the guard body including a nose whose rear end upstands from the forward end of said flat surface, the nose being formed with a cavity open to the rear end thereof above said surface, a tongue rigid with and projecting from the forward end of the plate into the cavity, said nose above the cavity having an opening to allow of movement of the tongue into the cavity from above, and a head on the cap to engage the tongue and the upper wall of the cavity and fill said opening when the cap is mounted on the guard.

3. A guard as in claim 2, in which said upper wall of the cavity, above the tongue, slopes downwardly and forwardly relative to the ledger plate whereby to wedge the plate against the body surface when the cap is advanced to an operative position on the guard.

4. A guard as in claim 2, in which the lower face of said head portion is formed with a shallow curved depending lip disposed to project ahead of the tongue and below the upper surface thereof when the cap is advanced to an operative position on the guard body.

References Cited in the file of this patent
UNITED STATES PATENTS

| | | |
|---|---|---|
| 70,311 | Allen et al. | Oct. 29, 1867 |
| 187,527 | Fesler et al. | Feb. 20, 1877 |
| 336,473 | Crist | Feb. 16, 1886 |
| 520,807 | Shipley | June 5, 1894 |
| 1,396,997 | Crawford | Nov. 15, 1921 |
| 1,629,793 | Hustad | May 24, 1927 |
| 1,645,606 | Lyle | Oct. 18, 1927 |
| 1,839,520 | Aamodt | Jan. 5, 1932 |
| 2,679,718 | Johnson | June 1, 1954 |
| 2,689,445 | Morrissey | Sept. 21, 1954 |